May 14, 1968 R. H. VETTER 3,383,153
PROJECTION SCREEN
Filed July 6, 1965
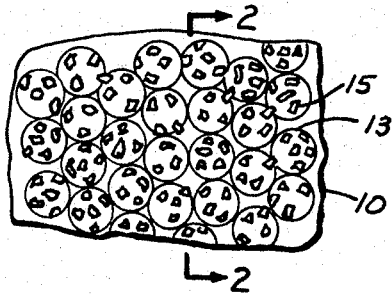
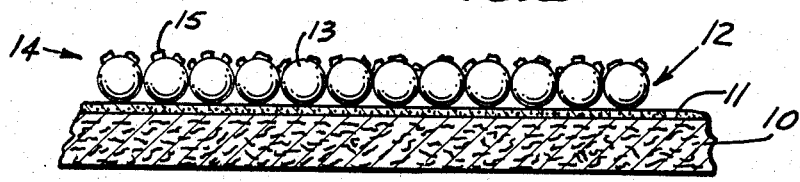
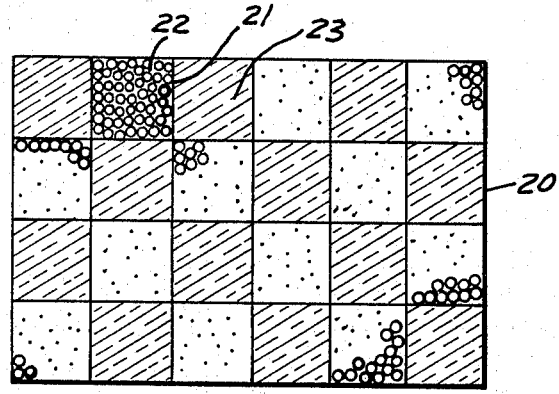
INVENTOR.
RICHARD H. VETTER
BY
ATTORNEYS.

United States Patent Office 3,383,153
Patented May 14, 1968

3,383,153
PROJECTION SCREEN
Richard H. Vetter, Pacific Palisades, Calif., assignor to D-150, Inc., Los Angeles, Calif., a corporation of California
Filed July 6, 1965, Ser. No. 469,385
3 Claims. (Cl. 350—126)

ABSTRACT OF THE DISCLOSURE

This invention relates to a projection screen which includes a base member to which a layer of transparent beads is secured. A randomly-distributed, discontinuous layer of opaque material is adhered to the exposed surface of the layer of beads so as to obscure random portions of the layer of beads. The beads comprise directionally reflective means, and the opaque material comprises diffusely reflective means. The assembly is a screen which includes optimized functions of both diffuse and reflective screens, and is especially useful in deeply curved screens for motion pictures.

---

This invention relates to projection screens.

It is known that audience approval and enjoyment of motion pictures can be enhanced by improving the color saturation and quality of the projected image, by increasing the size of the screen, and by curving the screen so as to give a dimension of depth, and to enable peripheral zones to be displayed, thereby to provide a feeling of "presence." It has not heretofore been possible to optimize all of the foregoing advantages with any one screen, because a screen which has had improved performance as to one feature has been deficient in others.

For example, a matte screen can provide an image of uniform brilliance because it scatters light rather uniformly over a wide angle. However, the concomitant defects are the need for a greater total light flux to secure an image of suitable brightness, as compared with "high-gain" screens, and a tendency for an image to be "washed out" by light reflected from one portion of the screen to another when the screen is curved.

In order to overcome some of the defiencies of matte screens, high-gain screens were developed, and there are many types. Familiar examples are the beaded screen, the aluminized screen, and the pearlescent screen. These have the feature in common that they tend to reflect a larger proportion of the luminous flux within a central cone, and a lesser proportion outside the cone as compared to matte screen. The resulting effect is one of considerable clarity and brilliance. However, when images are projected over very large screen areas, the brightness often varies from region to region, and the intensity of the whole image will vary from seat to seat in the theater. Then, if a suitably bright image is provided to one seat, an excessively bright image may be provided to another.

In brief, the ray-scattering of the matte screen and the ray-controlling of the high-gain screen are inherent properties of the two which are basically inconsistent. It is not to be expected that combining the two would do more than destroy the function of both. However, by utilizing the present invention, it is possible to combine normally inconsistent optical properties and still obtain the preponderant proportion of the best optical properties of both for a single screen.

As an example, the screen of this invention, when flat, retains the sharp clarity of both the matte and of the high-gain screen, while minimizing the illumination necessary to provide a suitably bright image and providing an image of reasonably uniform brightness over the full area of a large screen, and also of reasonably equal brilliance from seat to seat. Furthermore, in a radically curved screen, cross-illumination is essentially eliminated. In this screen, recourse need not be had to louvers and the like, such as is sometimes found in the prior art. Instead, this screen may be manufactured by standard, known techniques out of materials whose properties are well tested and known.

As a result of the combination of properties which ordinarily would be considered deleterious to each other, there is secured a screen which has wide utility whether small, large, flat, or curved. The example given of two selected properties is exemplary, and not by way of limitation; in this case they are diffuse and controlled reflection. Other pairs of properties could, instead have been selected to achieve other results.

The invention is carried out with a base which is overlaid by two types of reflective layers. These layers may be coincident in the sense of one overlaying the other, or separate in the sense of adjacency. One of the layers has a first optical property and the other has a different optical property, these properties being inconsistent with each other.

According to a preferred but optional feature of this invention, the selected property of one layer is controlled reflection, such as in a high-gain screen, and the selected property of the other layer is diffuse reflection, such as in a matte screen.

According to still another preferred but optional feature of the invention, the layer whose property is that of diffuse reflection is discontinuous and random, and overlays the other layer.

The above and other features of this invention will be fully understood from the following detailed description and the accompanying drawings, in which:

FIG. 1 is a fragmentary plan view showing a portion of the invention;

FIG. 2 is a cross-section taken at line 2—2 of FIG. 1; and

FIG. 3 is a plan view of an alternate embodiment of the invention.

The presently preferred embodiment of the invention is shown in FIGS. 1 and 2, wherein a base 10 which may comprise standard screen material bears a layer of adhesive 11 to which there adheres a layer 12 of reflective transparent beads 13 of the kind commonly used to form a high-gain screen. The beads substantially cover the base.

Atop the beads there is a layer 14 of opaque material 15. Layer 14 is discontinuous and comprises bits of opaque material adherent to layer 12. This opaque material may be the white, opaque, light-diffusing paint of the type conventionally utilized to form the surface of matte screens for motion picture projection.

The drawings are intended to show that the opaque material is laid down in discontinuous bits of random shape and random pattern. One way to do this is to spray or spatter the material onto layer 12 while the material is in liquid form. This technique constitutes an inherent means for controlling the density (surface coverage) of the layer. The longer the time that a spray of given density is applied to the beads, the more complete will be the coverage of the beads. In one setup using a nozzle that issues a spray containing a low ratio of liquid to air, it has been found that an exposure of about 15 seconds per square foot gives results of about 30% coverage (sometimes called a "single treatment"). The same application rate maintained about twice that long gives about 50% coverage (sometimes called a "double treatment"). It has been found that coverage of between about 20% and about 70% of the screen area with layer 14 provides an effective screen.

FIG. 3 shows an alternate embodiment of this invention where, instead of overlaying the opaque material in a random pattern, the two layers may be spaced apart from each other in either regular or random patterns. In FIG. 3 the pattern is shown as a checkerboard and it will be understood that to avoid a checkerboard appearance in the image, these areas will be made relatively small such as about ⅛" square. Upon a base 20 there are squares 21 constituting layers of beads 22 of the same type as beads 13. Interspersed with, and adjacent to, the beaded areas are continuous layers of opaque diffusing material 23 which may be laid down by means such as silk screening. This screen, while effective, does not give all of the advantages of that of FIG. 1 and is more difficult to produce. However, it does lie within the scope of the invention.

As a comparison to illustrate the advantages of the invention the table in the next paragraph is provided which shows the comparative properties of a white matte screen entirely covered by the opaque material which makes up layer 14, a conventional high-gain beaded screen entirely covered by beads such as beads 13, and then a single treated and a double treated screen in accordance with FIG. 1 and the foregoing specification.

The double treated screen is the presently preferred embodiment of the invention. These readings were taken utilizing a constant light source whose intensity is immaterial and the readings are in foot-lamberts. The light sensor for the zero degree readings was directed parallel to the incident ray and normal to the screen. The other angles are related to this perpendicular line, the sensor making the stated angle with a normal ray incident to the screen.

|  | White Matte | Beaded, not Treated | Beaded, Single Treated | Beaded, Double Treated |
| --- | --- | --- | --- | --- |
| Angle, Degree: | | | | |
| 0 | 20 | 41 | 30 | 25 |
| 20 | 19 | 13 | 12 | 16 |
| 40 | 18 | 11 | 11 | 15 |
| 60 | 18 | 11 | 10.5 | 15 |

The importance of the foregoing readings is that with the white matte screen the reflection is sensibly constant in all directions and therefore the intensity of the image will be less for any given light source near the center of the audience than with specialized screens such as the beaded screen. Also, when formed into a curved screen, there will be a substantial amount of light reflected from side to side. This cross-illumination washes out the image and greatly reduces the intensity of the colors.

With the beaded screen, there is an intense reflection at a center cone, and less reflection outside of the center cone. While this avoids at least some of the problems of cross illumination, still, and especially in a curved screen or a very wide screen, the image intensity will vary widely from location to location in the theater which is a matter of concern to persons skilled in the art of cinematography.

It will be noted that the reading at zero degrees for the single treated screen lies about midway between the readings for the matted and for the beaded screen, thereby achieving some of the advantages of both. The values for reflections at the off-axis angles means that cross-illumination in curved screens will be substantially less with the screens of the invention than if a white matte screen is used. Furthermore, the lesser gain of the treated screens constitutes an important advantage in reducing the difference between intensities from region to region over the full surface of the screen.

In the double treated screen where there is a greater density of opaque material it will be seen that the reflection at 0° is still closer to that of the matte screen, and that the reflection to the off-center angles is less than that of the matte screen, thereby achieving some of the advantages of the beaded screen while there remains a sensibly close range of intensities.

This screen reflects an image to the viewer which has a marked degree of color saturation, almost as much as the beaded screen, and much better than that of the matte screen. It has excellent contrast qualities. It has substantially all of the advantages of the beaded screen as to these two features, and avoids the disadvantages of both the matte and the beaded screen, especially in radically curved screens.

This screen, surprisingly, loses almost none of the color boost and saturation by being treated with the opaque material, while still losing some of the gain of the beaded screen, which gain is a disadvantage in certain installations. Thus, by combining two layers, whose properties are essentially inconsistent, the surprising result is attained of retaining the best properties of both, and of eliminating most of their troublesome properties.

The screen of FIG. 3 has many of the same advantages as that of FIG. 1, except that some of the better properties are reduced somewhat. The random pattern of matte material overlaying the beads does appear to provide a better and more effective combination of the inconsistent properties.

This invention is not to be limited by the embodiment shown in the drawings and described in the description which are given by way of example and not of limitation but only in accordance with the scope of the appended claims.

I claim:

1. A projection screen comprising: a base; a layer of transparent beads secured on said base; and a randomly distributed, discontinuous layer of opaque material adhered to the exposed surface of the layer of beads obscuring random portions of the layer of beads, said beads comprising directionally reflective means, and the opaque material comprising diffusely reflective means.

2. A projection screen according to claim 1 in which the proportion of the total surface covered by the opaque material is in the range between about 20% and 70%.

3. A projection screen according to claim 1 in which the opaque material is white.

References Cited

UNITED STATES PATENTS

| 1,868,834 | 7/1932 | Hurley | 350—126 |
| --- | --- | --- | --- |
| 2,378,252 | 6/1945 | Staehle et al. | 350—126 |
| 3,034,406 | 5/1962 | McKenzie et al. | 350—105 |
| 3,168,411 | 2/1965 | Walsh | 117—26 |
| 3,247,005 | 4/1966 | Parry et al. | 350—105 |

JULIA E. COINER, *Primary Examiner.*